(12) United States Patent
Weber

(10) Patent No.: US 8,600,591 B2
(45) Date of Patent: Dec. 3, 2013

(54) CONTROL DEVICE AND METHOD FOR THE OPERATION THEREOF

(75) Inventor: Matthias Alexander Weber, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/510,127

(22) PCT Filed: Oct. 18, 2010

(86) PCT No.: PCT/EP2010/065639
§ 371 (c)(1),
(2), (4) Date: May 16, 2012

(87) PCT Pub. No.: WO2011/057878
PCT Pub. Date: May 19, 2011

(65) Prior Publication Data
US 2012/0239230 A1    Sep. 20, 2012

(30) Foreign Application Priority Data
Nov. 16, 2009    (DE) .......................... 10 2009 053 457

(51) Int. Cl.
*B61L 3/00* (2006.01)
*B61L 15/00* (2006.01)

(52) U.S. Cl.
USPC ............... 701/20; 701/19; 246/126; 246/140; 246/182 A; 246/182 R

(58) Field of Classification Search
USPC ...... 701/19–20, 140, 182 A, 182 R; 246/126, 246/140, 182 A, 182 R
See application file for complete search history.

(56) References Cited

U.S. PATENT DOCUMENTS

| | | | |
|---|---|---|---|
| 5,282,424 A * | 2/1994 | O—Neill ....................... | 104/282 |
| 5,381,080 A | 1/1995 | Schnell et al. | |
| 7,168,661 B1 * | 1/2007 | Fox ........................... | 246/182 R |
| 7,380,478 B2 | 6/2008 | Harrington | |
| 7,829,805 B2 | 11/2010 | Ersoy et al. | |
| 8,051,740 B2 | 11/2011 | Giefer et al. | |
| 2004/0168606 A1 * | 9/2004 | Rosencrantz et al. ........ | 105/396 |
| 2005/0252322 A1 | 11/2005 | Harrington | |
| 2006/0200280 A1 * | 9/2006 | Kono et al. ..................... | 701/19 |
| 2008/0078604 A1 | 4/2008 | Ersoy et al. | |

(Continued)

FOREIGN PATENT DOCUMENTS

| | | |
|---|---|---|
| DE | 42 05 875 A1 | 9/1993 |
| DE | 103 38 263 A1 | 3/2005 |

(Continued)

*Primary Examiner* — Mary Cheung
*Assistant Examiner* — Atul Trivedi
(74) *Attorney, Agent, or Firm* — Laurence A. Greenberg; Werner H. Stemer; Ralph E. Locher

(57) ABSTRACT

A control apparatus has a control lever, in particular for controlling a locomotive or a traction vehicle, and a sensor device for detecting an operating position of the control lever. The sensor device has an angle measurement device which is suitable for measuring an adjustment angle of the control lever, forming a digitalized angle value. A measurement range of the angle measurement device is greater than an adjustment angle range of the control lever and an evaluation device is connected to the angle measurement device which determines the operating position of the control lever based on the digitalized angle value of the angle measurement apparatus.

11 Claims, 2 Drawing Sheets

(56) References Cited

U.S. PATENT DOCUMENTS

2008/0115613 A1 5/2008 Giefer et al.
2009/0069955 A1* 3/2009 Sheu ............................ 701/2
2012/0323420 A1* 12/2012 Koike et al. .................. 701/22

FOREIGN PATENT DOCUMENTS

| DE | 10 2004 056 800 A1 | 6/2006 |
| WO | 2005/114351 A1 | 12/2005 |
| WO | 2006/074645 A1 | 7/2006 |

* cited by examiner

CONTROL DEVICE AND METHOD FOR THE OPERATION THEREOF

BACKGROUND OF THE INVENTION

Field of the Invention

The invention relates to an operator control having an operator control lever, in particular for controlling a locomotive or a traction vehicle, and having a sensor device for sensing the operator control position of the operator control lever.

In rail vehicles, for example locomotives or traction vehicles, operator control levers are generally used in which the operator control function which is to be carried out is selected by the operator by adjustment of the deflection angle of the operator control lever. Deflection angles which are assigned a specific operator control function are secured, for example, by a ratchet disk. For analogue determination of position of the operator control lever—for example for monitoring purposes—an angle measuring device is generally used whose measuring range is adapted by the manufacturer to the maximum pivot angle of the operator control lever using, for example, a conversion gear mechanism which is adapted to the operator control lever. This has the advantage that maximum measuring accuracy is achieved during the measurement of angles; but it is disadvantageous that when a component is changed, for example when the operator control lever is replaced, extensive adaptation operations are necessary if the adjustment angle range of the old operator control lever which is to be replaced differs from that of the new operator control lever—for example a new conversion gear mechanism has to be used.

BRIEF SUMMARY OF THE INVENTION

The invention is based on the object of specifying an operator control which is particularly maintenance-friendly and permits replacement of components with little expenditure.

Accordingly, there is provision according to the invention that the sensor device has an angle measuring device which is suitable for measuring the adjustment angle of the operator control lever by forming a digitized angle value, wherein the measuring range of the angle measuring device is larger than the adjustment angle range of the operator control lever, and wherein an evaluation device, which determines the operator control position of the operator control lever on the basis of the digitized angle value of the angle measuring device, is connected to the angle measuring device.

A significant advantage of the operator control according to the invention can be considered to be the fact that said operator control permits different operator control levers with different adjustment angle ranges to be used; this is because owing to the measuring range of the angle measuring device which is provided according to the invention and which is larger than the adjustment angle range of the operator control part, it is possible to use operator control levers with different adjustment angle ranges if a replacement is necessary, for example, for the purpose of maintenance or repair. The measuring results of the angle measuring device can be converted and evaluated electronically because the angle measuring device supplies digitized angle values.

According to one particularly preferred refinement of the operator control, there is provision that the evaluation device has an assignment module which maps each of the digitized angle values supplied by the angle measuring device to an angle of the 360° unit circle—referred to below as unit circle angle. In the evaluation device a lever-specific configuration module is stored in which the associated operator control position of the operator control lever is respectively assigned to each unit circle angle of the operator control lever. The evaluation device is also configured in such a way that it determines the respective unit circle angle with the assignment module, and determines the respective operator control position of the operator control lever with the configuration module and the determined unit circle angle of the operator control lever. A particular characteristic of this variant is that separate modules are used, specifically an assignment module and a configuration module. The function of the assignment module is to convert the digital angle values supplied by the angle measuring device into unit circle angles which are independent of the measuring device. The assignment module therefore describes the mode of operation of the angle measuring device and generates measuring-device-independent measured values on the output side. The function of the assignment module is to map the mode of operation of the operator control lever and to specify what operator control position of the operator control lever is reached for the respective unit circle angles. The assignment module therefore describes the mode of operation of the operator control lever and is independent of the angle measuring device used since the assignment module operates on the basis of the unit circle angles which, as already mentioned, are independent of the angle measuring device used. Using separate modules makes it possible to perform very easy adaptation of the operator control if individual components, such as for example the operator control lever or the angle measuring device, are replaced by another operator control lever or another angle measuring device, since all that is necessary is to adapt the corresponding module, that is to say the assignment module or the configuration module.

The assignment module and the configuration module are preferably formed by software modules, for example in the form of files. Such software modules may also be supplied, for example, by the suppliers of the angle measuring device or of the operator control lever in order to permit easy installation or replacement of the components supplied by them.

Moreover, it is considered advantageous if the angle resolution of the angle measuring device is set in such a way that the digitized angle values can cover the entire angle range of the unit circle of 360 degrees. The angle measuring device can therefore preferably measure adjustment angles in the entire angle range of the unit circle of 360°. With such a refinement of the operator control it is ensured that operator control levers can be used with any complete adjustment angle ranges and that it is always possible to evaluate and determine the respective operator control positions.

The evaluation device may be formed, for example, by a data processing system.

The invention also relates to a rail vehicle, in particular a locomotive or a traction vehicle, having an operator control such as that described above.

The invention also relates to a method for determining the operator control position of an operator control lever of an operator control.

With respect to such a method the invention provides that the adjustment angle of the operator control lever is measured with an angle measuring device by forming a digitized angle value, wherein the measuring range of the angle measuring device is larger than the adjustment angle range of the operator control lever, and wherein the operator control position of the operator control lever is determined with an evaluation device on the basis of the digitized angle value of the angle measuring device.

With respect to the advantages of the method according to the invention, reference is made to the statements above relating to the operator control according to the invention since the advantages of the operator control according to the invention correspond essentially to those of the method according to the invention. Advantageous refinements of the method according to the invention are specified in dependent claims.

The invention will be explained in more detail below with reference to exemplary embodiments; in the drawings:

DESCRIPTION OF THE INVENTION

For the sake of clarity, the same reference symbols are always used for identical or comparable components in the figures.

Figure 1:
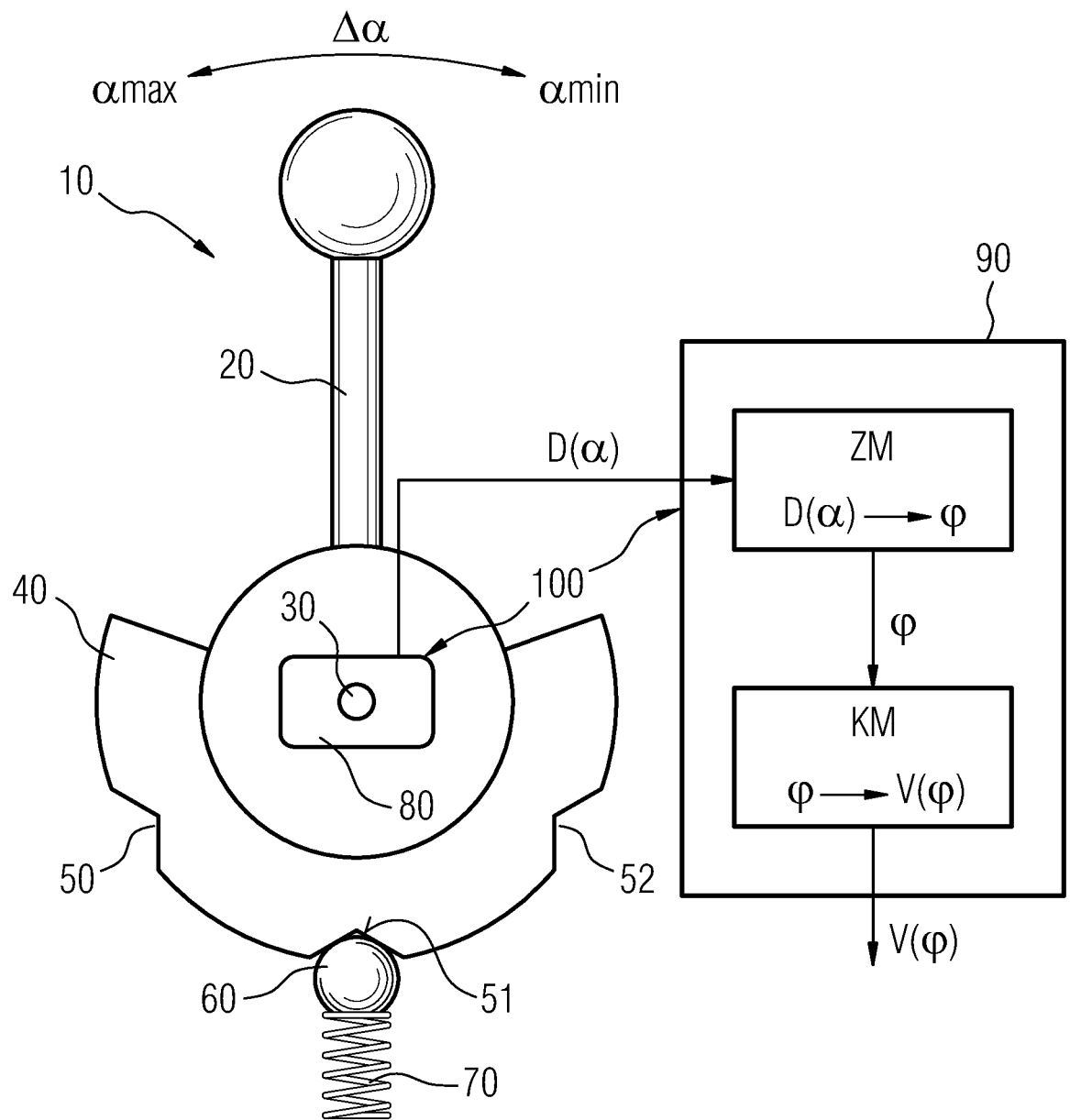
FIG. 1 shows by way of example an exemplary embodiment of an operator control according to the invention on the basis of which the method according to the invention is also explained by way of example.

In FIG. 1, operator control 10 with an operator control lever 20 which can be pivoted about a lever axis 30 can be seen. The possible adjustment angle range of the operator control lever 20 is characterized in FIG. 1 by the reference symbol $\Delta\alpha$. It is apparent that the operator control lever can be pivoted between an angle $\alpha$min up to an angle $\alpha$max.

A ratchet disk 40, which is equipped with recesses 50, 51 and 52, is connected to the operator control lever 20. The recesses 50, 51 and 52 interact with a locking element 60 which is pressure-loaded by a spring 70 and is pressed upward in FIG. 1. Operator control positions of the operator control lever 20 are predefined by the recesses 50, 51 and 52: if in fact the ratchet disk 40 is pivoted in such a way that the locking element 60 can engage in one of the recesses, the respective operator control position of the operator control lever 20 is locked in a sprung fashion by means of the spring 70.

An angle measuring device 80, which measures the respective adjustment angle $\alpha$ of the operator control lever 20 and generates angle values $D(\alpha)$ which are digitized on the output side, is connected to the operator control lever 20 and respectively to the ratchet disk 40.

An evaluation device 90 is connected on the output side to the angle measuring device 80, the digitized angle values $D(\alpha)$ being fed to the evaluation device 90. In order to process the digitized angle values $D(\alpha)$, the evaluation device 90 has an angle-measuring-device-specific assignment module ZM which processes the digitized angle values $D(\alpha)$ which are fed to the evaluation device 90.

Arranged downstream of the angle-measuring-device-specific assignment module ZM is a lever-specific configuration module KM which generates on the output side a signal for the operator control position $V(\phi)$ of the operator control lever 20.

The angle measuring device 80 and the evaluation device 90 form a sensor device 100 of the operator control 10.

The operator control 10 can be operated, for example, as follows:

The digitized angle values $D(\alpha)$ which are formed by the angle measuring device 80 are fed to the angle-measuring-device-specific assignment module ZM and are processed thereby. In this processing step, the assignment module ZM generates a unit circle angle $\phi$ which corresponds to the digital angle value $D(\alpha)$, supplied by the angle measuring device 80, on the 360° unit circle.

The unit circle angle $\phi$ which is generated by the assignment module ZM is transmitted to the configuration module KM in which the associated operator control position $V(\phi)$ of the operator control lever is respectively assigned for each unit circle angle $\phi$ of the operator control lever 20. The configuration module KM therefore assigns the stored operator control position $V(\phi)$ to the unit circle angle $\phi$ which is received by the assignment module ZM, and outputs said stored operator control position $V(\phi)$ on the output side at the output of the evaluation device 90 in the form of a corresponding output signal.

Figure 2:
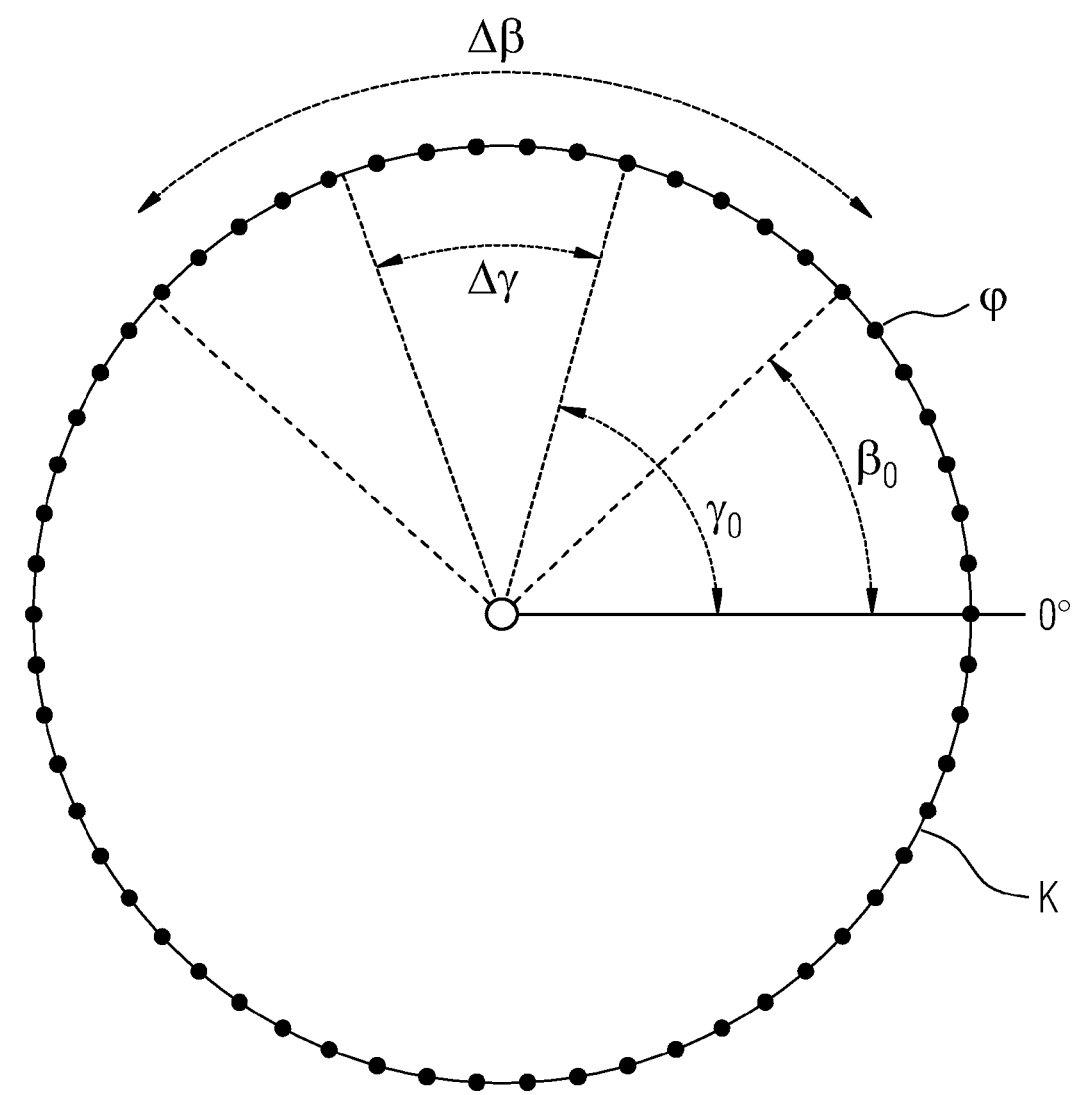
FIG. 2 shows by way of example the mode of operation of an evaluation device of the operator control according to FIG. 1 if an operator control lever of the operator control is replaced by a new operator control lever with another adjustment angle range.

FIG. 2 is a schematic illustration of how the assignment module ZM carries out the assignment between the digitized angle values $D(\alpha)$ and the unit circle angle $\phi$. The unit circle K on which unit circle angles $\phi$ in the form of dots are indicated can be seen. Angle values which are supplied by the angle measuring device 80 are assigned to the unit circle angles $\phi$. Depending on the operator control lever 20 used, the adjustment angle range $\Delta\alpha$ according to FIG. 1 can be of different sizes; the starting angles $\alpha$min at which pivoting of the operator control lever 20 begins can also differ.

FIG. 2 illustrates by way of example the respective starting angle and adjustment angle range by means of dashed lines for two different operator control levers; in this context, $\Delta\beta$ denotes the adjustment angle range of a first operator control lever, $\beta_0$ denotes the starting angle of this first operator control lever, $\Delta_\gamma$ denotes the adjustment angle range of a second, different operator control lever and $\gamma_0$ denotes the starting angle of this second, different operator control lever.

It is apparent that the adjustment angle ranges and the starting angles are mapped onto unit circle angles of the 360° unit circle. The assignment between the adjustment angles or the digitized angle values $D(\alpha)$ and the unit circle angles $\phi$ is independent of the operator control lever used and is determined only by the method of functioning of the angle measuring device 80. As a result of the assignment of the adjustment angles $\alpha$ to unit circle angles $\phi$, a pre-evaluation is therefore carried out which is determined merely by the mode of operation of the angle measuring device 80 and is independent of the operator control lever. The influence of the operator control lever 20 on the respective operator control position is taken into account by the lever-specific configuration module KM which specifies the respective operator control position as a function of the determined unit circle angle $\phi$. The lever-specific configuration module KM is therefore independent of the angle measuring device 80 used since the mode of operation thereof is described by the assignment module ZM.

The separation of the assignment module ZM and of the configuration module KM then makes it possible to replace the angle measuring device 80 or replace the operator control lever 20 without a large degree of expenditure. If, for example, the operator control lever 20 is replaced by another operator control lever with another adjustment angle range $\Delta\alpha$, the evaluation device 90 merely has to load and/or allow for a configuration module KM which describes the method of functioning of the operator control lever 20. The assignment module ZM can remain unchanged since the angle measuring device 80 as such is not changed.

If on the other hand, the angle measuring device 80 is replaced by another angle measuring device, wherein the operator control lever 20 remains unchanged, all that is necessary is to install in the evaluation device 90 a new assignment module ZM which allows for the mode of operation of the new angle measuring device 80 and permits correct assignment of the digitized angle values $D(\alpha)$ to unit circle angles $\phi$. The configuration module KM can remain unchanged at this point since nothing changes with respect to the operator control lever 20 and therefore with respect to the assignment between the unit angles $\phi$ and the respective operator control position.

In summary it is therefore to be noted that using assignment modules which describe the method of functioning of the angle measuring device 80 and configuration modules KM which describe the mode of operation of the operator control lever makes it possible to easily replace and modify individual components of the operator control 10.

The described use of assignment modules ZM and configuration modules KM therefore makes it possible, in other words, to ensure that each lever position of an operator control lever has an assigned fixed unit circle angle or unit circle angle range independently of a specific operator control function. Therefore, identical unit circle angles are generated in the same position for all the operator control levers independently of specific deflection angles with the result that using a configuration module KM, which is, for example, supplied by the manufacturer of the operator control lever 20, permits simple parameterization of the operator control 10 with respect to the operator control lever 20 used. If the operator control lever 20 is to be replaced by another operator control lever, all that is necessary after mechanical replacement of the operator control lever is to replace the old configuration module by a new configuration module which characterizes the mode of operation of the operator control lever 20 in terms of its operator control positions which are made available. The other components of the evaluation device 90, in particular the assignment module ZM which characterizes the method of functioning of the angle measuring device 80, can remain unchanged.

In summary it is to be noted that the described standardization or modulization of the evaluation device 90 reduces the expenditure on adaptation if parts of the operator control 10 are replaced by other parts, for example by another operator control lever or by another angle measuring device; this is because all that has to be done at the evaluation device is to update the corresponding modules which describe the replaced parts.

LIST OF REFERENCE SYMBOLS

10 Operator control
20 Operator control lever
30 Lever axis
40 Ratchet disk
50 Recess
51 Recess
52 Recess
60 Locking element
70 Spring
80 Angle measuring device
90 Evaluation device
100 Sensor device
$\alpha$ Adjustment angle
$\Delta\alpha$ Adjustment angle range
$\Delta\beta$ Adjustment angle range
$\beta_0$ Starting angle
$\Delta\gamma$ Adjustment angle range
$\gamma_0$ Starting angle
$\alpha min$ Angle
$\alpha max$ Angle
$\phi$ Unit circle angle
$D(\alpha)$ Angle value
K Unit circle
$V(\phi)$ Operator control position
KM Configuration module
ZM Assignment module

The invention claimed is:

1. An operator controller, comprising:
an operator control lever for controlling a locomotive or a traction vehicle;
a sensor device for sensing an operator control position of said operator control lever, said sensor device having an angle measuring device suitable for measuring an adjustment angle of said operator control lever by forming a digitized angle value, a measuring range of said angle measuring device is larger than an adjustment angle range of said operator control lever; and
an evaluation device determining an operator control position of said operator control lever on a basis of the digitized angle value of said angle measuring device, said evaluation device connected to said angle measuring device, said evaluation device having an assignment module for mapping each of the digitized angle values supplied by said angle measuring device to an angle of a unit circle being an unit circle angle, said evaluation device having a lever-specific configuration module in which an associated operator control position of said operator control lever is respectively assigned to each unit circle angle of said operator control lever, and said evaluation device configured such that said evaluation device determines a respective unit circle angle with said assignment module, and determines the respective operator control position of said operator control lever with said lever-specific configuration module and a determined unit circle angle of said operator control lever.

2. The operator controller according to claim 1, wherein said assignment module and said lever-specific configuration module are software modules.

3. The operator controller according to claim 1, wherein an angle resolution of said angle measuring device is set such that the digitized angle values can cover an angle range of a unit circle of 360 degrees.

4. The operator controller according to claim 1, wherein said angle measuring device can measure adjustment angles in an entire angle range of a unit circle of 360 degrees.

5. The operator controller according to claim 1, wherein said evaluation device has a data processing device.

6. The operator controller according to claim 1, wherein said assignment module and said lever-specific configuration module are software modules being in a form of files.

7. A vehicle including rail vehicles, comprising:
an operator controller, containing:
an operator control lever for controlling the vehicle;
a sensor device for sensing an operator control position of said operator control lever, said sensor device having an angle measuring device suitable for measuring an adjustment angle of said operator control lever by forming a digitized angle value, a measuring range of said angle measuring device is larger than an adjustment angle range of said operator control lever; and
an evaluation device determining an operator control position of said operator control lever on a basis of the digitized angle value of said angle measuring device, said evaluation device connected to said angle measuring device, said evaluation device having an assignment module for mapping each of the digitized angle values supplied by said angle measuring device to an angle of a unit circle being an unit circle angle, said evaluation device having a lever-specific configuration module in which an associated operator control position of said operator control lever is respectively assigned to each unit circle angle of said operator control lever, and said evaluation device configured such that said evaluation device determines a respective unit circle angle with said assignment module, and determines the respective operator control position of said operator control lever with said lever-specific configuration module and a determined unit circle angle of said operator control lever.

8. A method for determining an operator control position of an operator control lever of an operator controller, which comprises the steps of:

measuring an adjustment angle of the operator control lever with an angle measuring device based on unit circle angle components of a unit circle and forming a digitized angle value, a measuring range of the angle measuring device is larger than an adjustment angle range of the operator control lever; and determining the operator control position of the operator control lever with an evaluation device on a basis of the digitized angle value of the angle measuring device.

9. The method according to claim 8, which further comprises:

mapping digitized angle values which are supplied by the angle measuring device to an angle of the unit circle being a unit circle angle; and determining the operator control position of the operator control lever with a respectively mapped unit circle angle by reading out a lever-specific configuration module in which an associated operator control position of the operator control lever is respectively assigned to each unit circle angle of the operator control lever.

10. The method according to claim 8, which further comprises setting an angle resolution of the angle measuring device such that digitized angle values can cover an angle range of a unit circle of 360 degrees.

11. The method according to claim 8, which further comprises measuring adjustment angles in an entire angle range of a unit circle of 360 degrees with the angle measuring device.

* * * * *